United States Patent [19]

Miranowski

[11] 4,162,085
[45] Jul. 24, 1979

[54] SWINGABLE TRANSPORT BAR

[75] Inventor: Thomas D. Miranowski, Breckenridge, Minn.

[73] Assignee: Frontier, Inc., West Fargo, N. Dak.

[21] Appl. No.: 854,823

[22] Filed: Nov. 25, 1977

[51] Int. Cl.² ............................................. B60D 1/14
[52] U.S. Cl. .................................... 280/412; 172/625
[58] Field of Search .................. 280/411 R, 412, 413, 280/415 R, 462; 172/625, 248; 56/228

[56] References Cited

U.S. PATENT DOCUMENTS

| 2,332,006 | 10/1943 | Oehler | 56/228 X |
| 2,658,770 | 11/1953 | Koenig | 280/415 R |

Primary Examiner—John A. Pekar
Attorney, Agent, or Firm—James R. Cwayna

[57] ABSTRACT

A swingable transport bar comprising a linkage arrangement for attachment to press drills or other similar earth working equipment to transport the drill in normal seeding relationship across a field and thereafter to swing the linkage arrangement from a normal frontal position on the drill to an end position such that the drill may be towed down roadways or the like to present a width which is transportable. The swingable transport bar includes a first rigid bar attachable to a forward end of the device to be towed and a triangular, formable linkage arrangement which includes linkage members pivotally attached to the first bar to form a normal triangular towing hitch arrangement extending forwardly to the towing vehicle and which triangular arrangement is shiftable to lie in adjacent relationship to the first mentioned bar such that the towing end of the arrangement will now be displaced to one side of the unit for pulling the unit in a sidewards direction. The invention includes means for latching the linkage members in their alternate positions without requiring the use of connector pins and the like such that normally such transition may be made without an operator getting off the towing vehicle and connecting and disconnecting the same.

5 Claims, 3 Drawing Figures

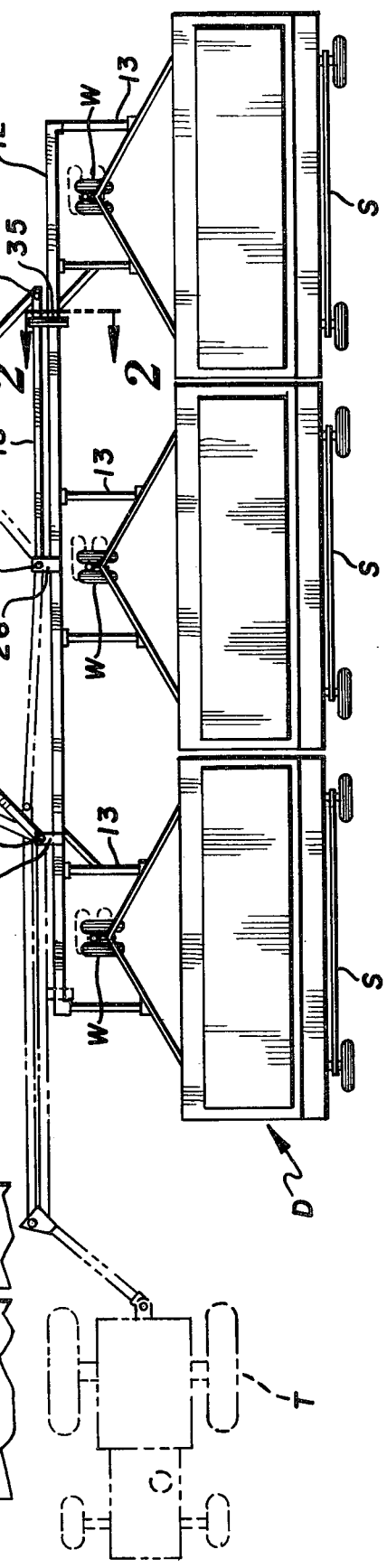
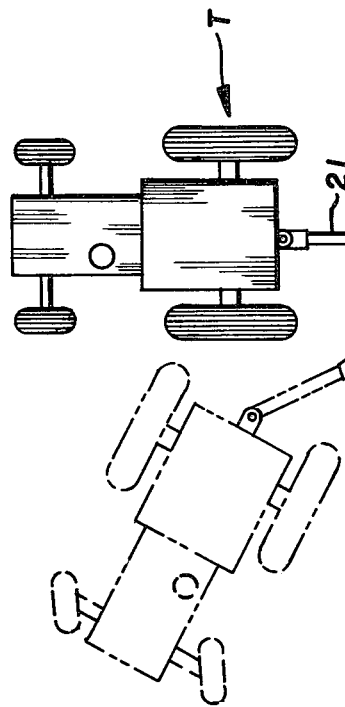
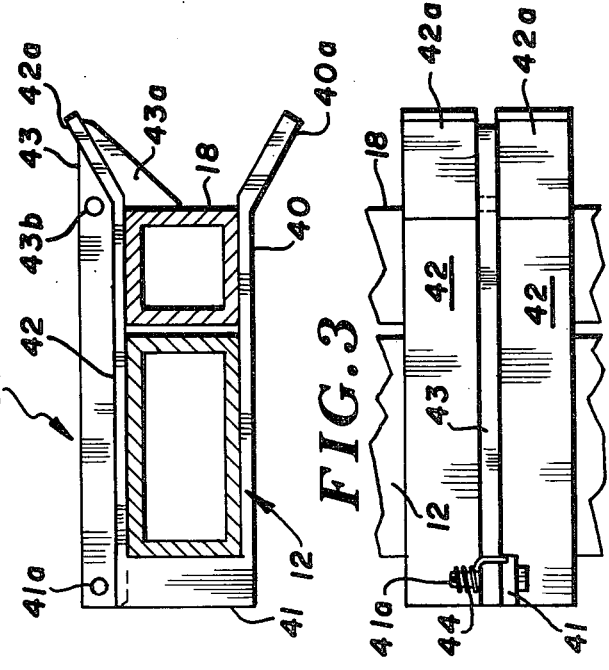

SWINGABLE TRANSPORT BAR

FIELD OF THE INVENTION

This invention relates generally to towing apparatus and more specifically to towing apparatus that is shiftable upon a device to be towed such that a first frontal towing position is provided for towing the device while it is in operative position and a second towing position is provided adjacent one end of the unit such that the device may be towed on roadways and the like and will be of a legal dimension for towing upon such roadways.

BACKGROUND AND OBJECTS OF THE INVENTION

The use of shiftable hitches in conjunction with farm equipment is not new in the art. The object of all such hitches is to provide means for towing a device for working a field which device is of a width that will normally not permit the same to be drawn or towed on roads but which is efficient for operating on the field and the hitch being shiftable to shift the towing point for the device to the end thereof such that the device may now be towed endwise on a road. In such devices, wheeling systems are provided which will rotate and accommodate these various towing positions, but this, again, is common to many such farm units. A primary object of all of these units is, as stated, to provide a two position or shiftable hitch device which will permit towing a grain or press drill or the like from both a frontal and side position and, ideally, a minimal amount of mechanical connections are provided to obtain the desired positions. The units that are available in the present art require pins and other positive locking elements which, due to their configuration and operation, require personal operation, requiring the operator to climb off the towing vehicle and do the mechanical shifting or the mechanical pin or latch pulling to permit the unit to be so shifted.

With applicant 3 s device, a hitch mechanism is provided which eliminates complicated operation in that it will be unnecessary to get off the towing vehicle to control the operation of the unit. Obviously, if safety pins are desired in applicant's design, this will require the human element for placement of the same, but the basic concept of applicant's invention is to provide such a shiftable unit in the use of towing a device in, what may be termed, a forward or a sideward direction without complicated attachment or placement devices.

It is a further object of applicant's invention to provide a swing transport for farm machinery including grain drills and the like which includes a triangular formable linkage bar system attachable to the unit to be towed which linkage system permits the formation of a triangular towing arrangement in a first position and permits the triangular configuration to be shifted into a parallel link relationship for effective end towing of the unit.

It is a further object of applicant's invention to provide a swing transport for farm equipment which includes means for locking various link portions of a triangular link mechanism which locking action is provided to positively hold the members in locked position by simply shifting the element to be locked into its proper position and forcing the same past a latch mechanism which latch will effectively hold the same in the desired position until it is released therefrom.

These and other objects and advantages of the invention will more fully appear from the following description made in connection with the accompanying drawings in which the same numeral is used to designate the same or similar parts throughout the several views, and in which:

FIG. 1 is a top plan view of a press drill having the swing transport mechanism as provided in applicant's invention mounted thereon with the swing transport mechanism illustrated in several positions and such positions being from a normal towing, operative position shown in solid lines to sequential shifting of the same and the towing vehicle into an end, road towing position with the linkage shifting thereof being shown again in dotted lines;

FIG. 2 is a vertical section taken substantially along line 2—2 of FIG. 1 illustrating the latching mechanism; and, FIG. 3 is a top plan view taken of FIG. 2.

In accordance with the accompanying drawings, applicant's invention is generally designated 10 and is illustrated in position to attach a farm unit such as a grain drill D to a towing vehicle such as a tractor T. In order to provide for both forward and rearward movement of the grain drill D, sets of primary support wheels W are normally provided on the front thereof and these wheels are free to rotate from the normal solid line position illustrated which permits forward movement, to a side directed position, shown in dotted lines, which will permit sideways transportation. In addition to these first wheels, wheel sets S are provided on a rear of the grain drill D and these wheels are normally directed sidewardly and are arranged to be raised and lowered into and out of ground contact such that they are in ground contact when the unit is pulled sidewardly and out of contact when the unit is pulled in a forward operative direction.

Applicant's invention 10 includes a first mounting or attachment bar 12 attached, in the form shown, to the unit D through a plurality of support and connecting bars 13 extending rearwardly from the bar 12 and which bars 13 are secured to the drill D either temporarily or permanently. As illustrated, the main support bar 12, in the form shown, comprises a rectangular, tubular structure of a first predetermined height and width and this bar extends substantially across the front of the unit to be towed.

As illustrated, the actual towing connective section is designated 15 and, in the form show, includes a set of three linkage members designated 16, 17 and 18. The first such link, 16, is pivotally mounted upon the support bar 12 as through an extending bracket 19 and an attachment pin extending through the connecting bar 19 and through the linkage member 16. The forward end of such link bar 16 is fixedly attached to a tow bar 21 at a predetermined angular position such that when the linkage members 16, 17 and 18 are in their triangular configuration, the connecting bar 21 extends in a direction which will enable the drill D to be pulled properly down the field. Obviously, the angularity between bars 16 and 21 will vary in accordance with the dimensions picked for the linkages. Arranged intermediately along the bar 16 is a latching and guiding connector member designated 25 which connector member will hold the bar 16 in the proper position for sideways towing of the device D. The structure of this connector member 25 is the same as the connector member 35 to assist in retaining the linkage member 18 in position and a total description of such devices will be supplied hereinafter.

Second linkage member 17 is pivotally attached at one end to the forward end of link 16 and, as illustrated, a connective plate 16a may be provided at the forward end of the bar 16 to accommodate such attachment. A pin 17a may be provided for such pivotal attachment. The opposite end of link 17 is pivotally attached to one end of linkage member 18 and in this instance, a pin 17b is utilized. The linkage member 18 is pivotally attached to the approximate center point of the first mounting bar 12 through an extending connective plate construction 26 and pin 26a. To accommodate the proper movement of the linkage bars 16, 17 and 18, it should be obvious that the lengths of the bars 16, 17 should be approximately equal while the length of the linkage bar 18 is approximately ½ of the length of these members 16, 17. This length consideration allows the bars 16, 17 to be in side by side relation when the unit is in the side tow position and this side by side relation is permitted by the length and position of the link 18 and its position of attachment to the first bar 12.

As previously mentioned, a first connector member 25 is provided on the bar 16 and an identical member designated 35 is provided on bar 12 intermediate the connective plate structure 25 and the end of such bar 12. More specifically, this connector member 35 is provided on the bar 12 at a distance from the connective plate structure 26 slightly less than the longitudinal dimension of the link 18.

The structure of these guiding and latching members 25, 35 is illustrated in the views of FIGS. 2 and 3. As illustrated therein, the bar 12 provides a mounting element for the member 35 when the same is mounted thereon and the linkage 16 provides a mounting for the member 25 when the same is mounted thereon but the shape, size and function of these two devices 25, 35 is identical.

As illustrated in FIGS. 2 and 3, the latching and guiding members include a first lower plate 40 having a downwardly and forwardly directed lip 40a, an upstanding bar or support element 41, a second, upper plate 42 extending forwardly from the upstanding support 41 and having an upwardly and forwardly extending lip 42a thereon and a swingable latch member 43 pivotally arranged on the upstanding support 41 and lying between the sections of the upper plate 42.

As illustrated, the upper plate structure 42 consists of a pair of spaced apart plate elements, each designated 42 with the latch member 43 being swingably mounted therebetween.

The latching member 43 may be positioned on the support 41 through a pin member 41a or the like.

It should be noted that the dimension of the upper and lower plate structures 40, 42 permits the mounting of the same about the bar 12 or link 16 with the dimension permitting the receipt of the bar or link therebetween and further allowing the downwardly directed capturing lip 43a of the latch 43 to close over the received bar or link. The outwardly directed lips 40a, 42a assist in guiding the respective bar or link into this capturing area and the sloped frontal surface of latch 43 provides shifting of the same to permit entry of an element into captured position.

It should be obvious that these latching and guiding members 25, 35 are directed to properly receive the link or bar for capturing the same. It should also be obvious that modifications in the upper and lower plates and the latch may be provided without departing from the scope of the invention and that a simple remote opening arrangement may be provided with an aperture 43b through latch 43 to permit the same to be rope controlled. It should also be obvious that latch element 43 may be biased into a locking position and this may be accomplished through a torsion spring 44 mounted on pin 41a.

The operation of the device should be obvious. In transporting position, the towing vehicle T is arranged to one end of the drill D and in this position, the connector unit 25 of link 16 will engage bar 12 and hold the linkage into its side by side relationship. When the field is reached, the towing vehicle T is shifted to its drive position by disengaging connector unit 25 and simply backing and guiding the tractor into a forward position directed normally to the unit D. In this backing technique, the connector 35 will now receive link 18 to hold the same and to thus hold the linkages 16, 17 and 18 in their triangular configuration.

Applicant's device has several advantages and one is the ease of positive and proper positioning thereof and a second is the positioning thereof without requiring an operator to get off the towing vehicle. Obviously, if safety links or safety chains are used, the operator would have to secure these, but this is in addition to and not necessary to the invention.

What I claim is:

1. A connector arrangement for towing of vehicles by a towing vehicle in a first operative position and a second travel position, said connector arrangement including:
   a. an attachment bar arranged and constructed to extend generally transversely across a frontal portion of the article to be towed;
   b. a first link member of a first longitudinal dimension, said first link member having a first and a second end, said first end being pivotally attached to said attachment bar;
   c. a second link member of a first longitudinal dimension, said second link member having a first and second end, said first end thereof being pivotally attached to said second end of said first link member;
   d. a third link member of a second longitudinal dimension, said third link havng a first and second end, said first end thereof being pivotally attached to said attachment bar and said second end being pivotally attached to said second end of said second link member.
   e. said dimensions of said links and the positions of attachment therefore providing a connector arrangement of a triangular configuration in a first operative towing position and a configuration wherein said attachment bar and said first and second link members are arranged in side by side relation to provide a travel position; and
   f. connector means provided for releasably connecting one of said links to said attachment bar for maintaining said links in a triangular configuration for operative towing and for releasably connecting a second of said links to maintain said first and second links in said side by side relation.

2. The structure set forth in claim 1 and said connector means includes a pair of connectors, a first of said connectors releasably connecting said first link to said attachment bar and a second of said connectors releasably connecting said third link to said attachment bar.

3. The structure set forth in claim 1 and said connector means including angularly diverging guide means to guide a link portion to be received therein and latch means to capture said link.

4. The structure set forth in claim 3 and biasing means normally urging said latch into capturing position.

5. The structure set forth in claim 4 and said latch being provided with a camming surface whereby a link member being guided therein will urge said latch into open position and permit entry of said link into said connector means.

* * * * *